2,602,266

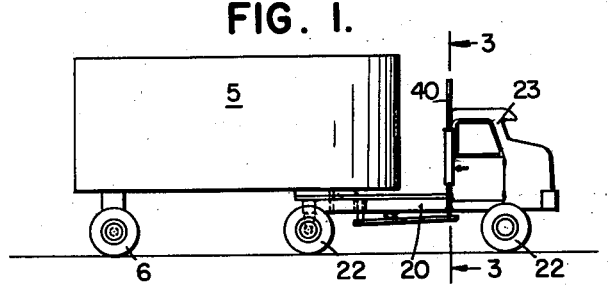
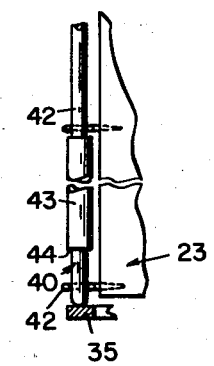
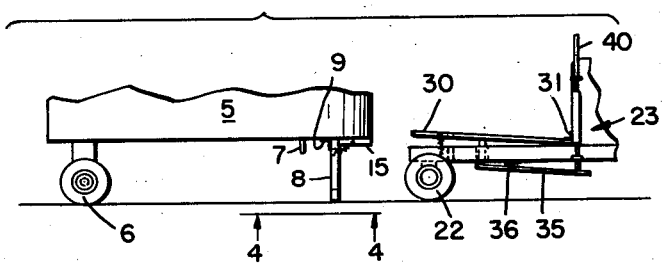
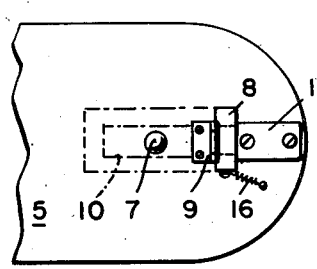
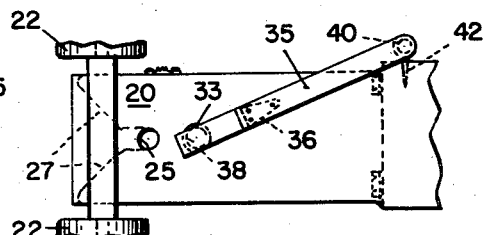
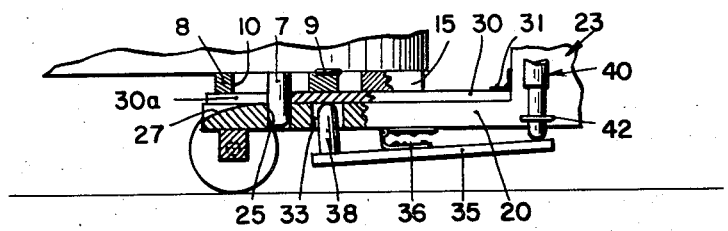
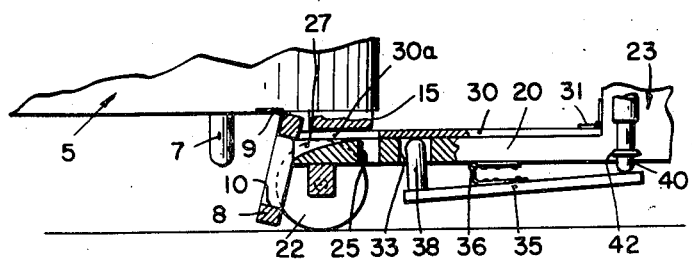
July 8, 1952 — H. G. PRESTON — 2,602,266
TOY TRAILER HITCH
Filed July 13, 1950
INVENTOR
HERBERT G. PRESTON
BY Mason & Graham
ATTORNEYS Patented July 8, 1952

UNITED STATES PATENT OFFICE 2,602,266

TOY TRAILER HITCH

Herbert G. Preston, Whittier, Calif.

Application July 13, 1950, Serial No. 173,543

5 Claims. (Cl. 46—201)

This invention has to do with toy trucks and trailers and relates more particularly to means for detachably hitching a toy trailer to a toy truck.

It is the primary object of my invention to provide a truck and trailer toy in which the trailer may be readily attached to and detached from the truck, and which, when the trailer is detached, has novel and simple means for supporting its forward end in elevated position.

Other objects and advantages will appear as the following detailed description of a presently preferred embodiment of the invention proceeds, and for which purpose I shall refer to the accompanying drawings, wherein:

Fig. 1 is a side elevation showing the truck and trailer attached to each other;

Fig. 2 is a side elevation showing the truck and trailer detached from each other;

Fig. 3 is an enlarged view taken on line 3—3 of Fig. 1;

Fig. 4 is an enlarged view taken on line 4—4 of Fig. 2;

Fig. 5 is an enlarged bottom plan view of the truck;

Fig. 6 is a fragmentary, enlarged side elevation, partly in section, showing the trailer in the course of being hitched to the truck; and Fig. 7 is an enlarged side elevation, partly in section, showing the truck and trailer in hitched position.

Referring now to the drawings, 5 denotes a toy trailer having wheels 6 and a depending king-pin 7. A support 8 is swingably attached to the bottom of the trailer by a hinge 9. The support has a rectangular opening 10 to permit it to swing into position against the bottom of the trailer and thus to pass over the king-pin, as shown in Fig. 7. The purpose of the support is to elevate the front end of the trailer when it is detached from the truck, and to hold it in proper position to effect the hitching operation by backing the truck under the front end of the trailer. A stop 15 is secured to the bottom of the trailer to prevent further forward swinging movement of the support, and the support is urged toward the stop, or into upright position, by a coil spring 16 secured at one end to the trailer bottom and at its other end to the support (Figs. 2 and 4).

The truck has a flat body 20 supported by wheels 22, the front portion of the body being in the shape of a cab 23.

The body 20 has an opening 25 adjacent its rear end to receive the king-pin 7 and the rear end of the body is notched at 27 to guide the king-pin into the opening 25 when the truck is backed under the trailer. The top surface of the rear end of the truck body defined by the notch 27 slopes toward the rear, and the side walls of the notching converge toward the opening 25.

The body has a swingable top or floor portion 30 hinged thereto at 31, and there is a hole 33 in the body beneath the rear end portion of the floor 30.

A lever 35 is secured to the bottom of the body by a hinge 36 which acts as a fulcrum, and the rear end of the lever has an upstanding finger 38 disposed in hole 33. The forward end of the lever is engaged by a plunger 40 mounted on the cab portion by guides 42. The plunger simulates an exhaust stack for the truck, and has an enlarged diameter intermediate portion 43 providing a downwardly facing annular shoulder 44 which abuts the lower guide to limit downward movement of the plunger.

The purposes and functions of the various parts will be better understood from the following description of the operation of the device.

With the trailer detached from the truck, the trailer has its front end elevated by the support 8 (Fig. 2). To hitch the truck to the trailer, the rear end of the truck is backed under the forward end of the trailer. During this operation, the rear end of the body engages the support 8 and swings it into the positions of Figs. 1 and 7, and the king-pin rides up the sloping surface of the body, being guided by notched surfaces 27, until it drops into opening 25. Inasmuch as the rear end portion of the floor 30 is also provided with a rearwardly flaring slot 30a, the king-pin also passes along this slot during this hitching operation. The trailer is thus hitched to the truck.

To unhitch the trailer, the operator pushes downwardly on plunger 40, thus causing the plunger to swing the lever 35 about its fulcrum, pushing finger 38 upwardly through hole 33 and against the swingable floor 30 causing the floor to swing upwardly to engage and lift the forward end of the trailer sufficiently to free the king-pin from opening 25. Then, by moving the truck forwardly, it may be pulled from beneath the trailer. As the truck moves from under the trailer, the support 8 swings downwardly into vertical position to provide a support for the forward end of the trailer.

I claim:

1. In a truck and trailer toy, a truck body having an opening therethrough adjacent its rear end, a trailer having a kingpin depending from the bottom of its forward end and engaging in said opening, and a lever swingably mounted on the truck body for lifting engagement with said trailer body whereby to lift the trailer body from the truck body sufficiently to free the kingpin from said opening, said trailer having a support swingably mounted on its bottom forwardly of said kingpin, said support having an opening therethrough to pass said kingpin when the support is in position against the bottom of the trailer.

2. In a truck and trailer toy, a truck body having a pair of longitudinally spaced holes therethrough, a floor swingably mounted on said body in position covering the forward one of said holes, a lever pivotally attached to the body, said lever having at its rear end portion a finger projecting into said forward one of said holes whereby to engage and lift said floor, and a trailer having a depending kingpin engaging in the rear one of said holes and having a bottom surface resting upon said floor, said kingpin being releasable from said hole when said floor is lifted by said lever a distance equal to the length of said kingpin.

3. In a toy truck, a truck body having a pair of longitudinally spaced holes therethrough the rearmost one of said holes being adapted to receive the kingpin of a trailer element, a floor swingably mounted atop said truck body in position overlying the forwardmost of said holes, said floor being adapted to support the forward portion of the body of said trailer, a finger mounted for axial movement in said latter hole whereby to engage and lift said floor, and a lever mounted on the truck body and operably attached to said finger.

4. The truck of claim 3 wherein the top surface of the truck body is notched to provide a guideway for the kingpin of said trailer in its movement toward said rearmost hole.

5. In a truck and trailer toy, a truck body and a trailer body, said truck body having an opening therethrough adjacent its rear end and having a rearwardly and downwardly sloping rear end top surface disposed to guide the forward end of the trailer body on to the rear end of the truck body, said trailer body having a king pin depending from the bottom of its forward end portion for engagement in said opening, and a lever swingingly mounted on the truck body in position for lifting engagement with said trailer body sufficiently to free said king pin from said opening.

HERBERT G. PRESTON.

REFERENCES CITED

The following references are of record in the file of this patent:

UNITED STATES PATENTS

| Number | Name | Date |
| --- | --- | --- |
| 1,316,735 | Olds | Sept. 23, 1919 |
| 2,233,116 | Voorheis | Feb. 25, 1941 |